G. P. B. HOYT.
WIRE SPOKE WHEEL.
APPLICATION FILED OCT. 11, 1916.
1,289,780. Patented Dec. 31, 1918.
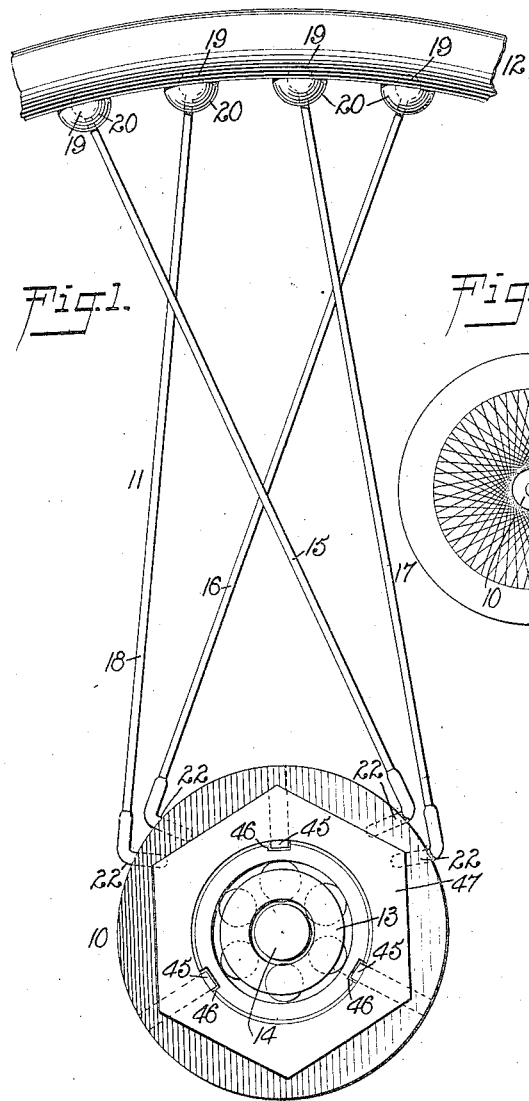
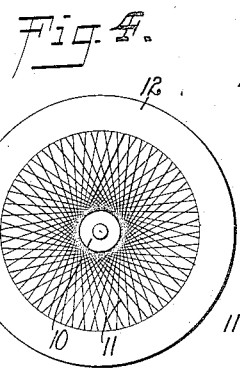
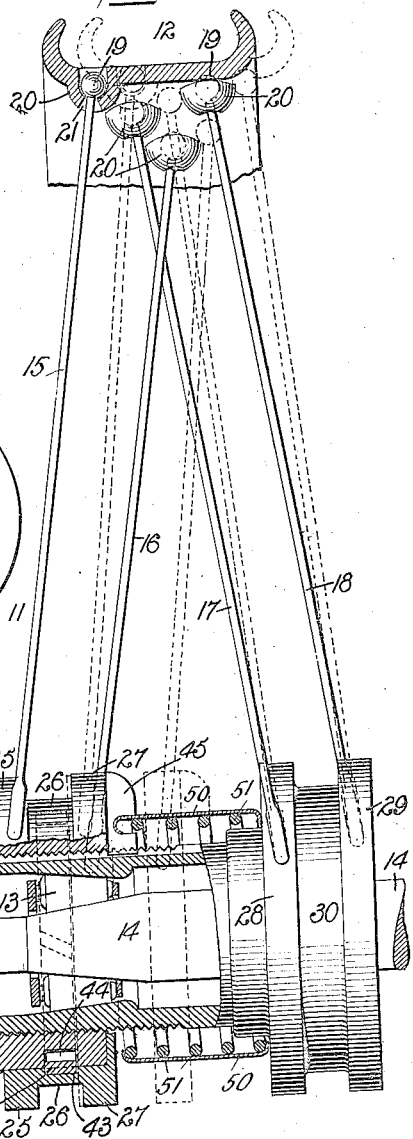
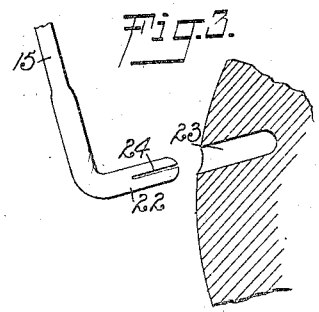
WITNESSES
INVENTOR
Gabriel P. B. Hoyt
BY
ATTORNEYS

UNITED STATES PATENT OFFICE.

GABRIEL P. B. HOYT, OF NEW YORK, N. Y.

WIRE-SPOKE WHEEL.

1,289,780.

Specification of Letters Patent.   Patented Dec. 31, 1918.

Application filed October 11, 1916.   Serial No. 125,007.

*To all whom it may concern:*

Be it known that I, GABRIEL P. B. HOYT, a citizen of the United States, and a resident of the city of New York, Jamaica, borough of Queens, in the county of Queens and State of New York, have invented a new and Improved Wire-Spoke Wheel, of which the following is a full, clear, and exact description.

The object of the invention is to provide a new and improved wire spoke wheel for use on bicycles, automobiles and other vehicles, and arranged to render the wheel exceedingly strong and durable, to permit of conveniently and quickly placing the spokes in position on the hub and rim of the wheel, and to allow removal of any one of the spokes and replacing thereof by a new one, if necessary, and to dispense entirely with nipples, nuts and like devices now generally used in the construction of wheels of this type.

In order to accomplish the desired result use is made of front and back pairs of wire spokes arranged one relative to the other to form a truss connecting the hub with the rim or felly.

A practical embodiment of the invention is represented in the accompanying drawings forming a part of this specification, in which similar characters of reference indicate corresponding parts in all the views.

Figure 1 is a face view of a portion of a wire spoke wheel;

Fig. 2 is a cross section of the same with the fixed head of the hub shown in elevation;

Fig. 3 is an enlarged sectional side elevation of a portion of the hub and the inner end of the spoke in detached position; and Fig. 4 is a reduced face view of the wire spoke wheel.

The wire spoke wheel in its general construction consists of a hub 10, sets of wire spokes 11 and a rim or felly 12, of which the hub 10 is mounted by ball or roller bearings 13 on the axle or spindle 14, in the usual manner. Each set of wire spokes 11 consists of a pair of front spokes 15, 16 and a pair of rear spokes 17, 18, and each of the spokes 15, 16, 17 and 18 is provided at its outer end with a ball 19 engaging a correspondingly shaped socket 20 formed in the inner face of the rim 12. The sockets 20 are open at the outer ends for the insertion of the spokes and are provided with cut-out portions 21 at the bottoms to allow swinging movement of the spokes in a transverse direction for the purpose hereinafter more fully explained. The sockets 20 are spaced equal distances apart in a circumferential direction, as will be readily understood by reference to Fig. 1, but the sockets for the two pairs of spokes are located in different planes, as will be readily understood by reference to Fig. 2. The inner end of each of the spokes 15, 16, 17 and 18 is provided with an angular attaching member 22 having a longitudinal split 24 and the said angular member is adapted to engage a recess 23 formed non-radially in the peripheral face of the hub, as indicated in Figs. 1 and 3. By splitting each angular attaching member 22 the latter is provided with spring jaws which clampingly engage the wall of the recess 23 to hold the member 22 against accidental disengagement from the corresponding head flange and without the use of other fastening devices.

The angular members 22 of the spokes 15 are attached to an annular flange 25 formed on a movable hub head 26 provided with a second annular flange 27 engaged by the angular members 22 of the spokes 16. The angular members 22 of the spokes 17 engage an annular flange 28 formed on the hub head 30 provided with a second annular flange 29 engaged by the angular members 22 of the spokes 18. The hub head 30 forms an integral part of the hub 10 while the hub head 26 is movable on the hub toward and from the fixed hub head 30. For this purpose use is made of a nut 40 screwing on the outer threaded end 41 of the hub 10, and this nut 40 is rotatably mounted in the head 26. The head 26 is held against axial movement on the nut 40 by the use of a ring 42 seated in an annular recess 43 formed in the inner wall of the head 26, the said ring 42 also extending into an annular groove 44 formed exteriorly on the nut 40. The back of the flange 27 of the movable hub head 26 is provided with one or more keys 45 extending into keyways 46 formed lengthwise on the outer face in the hub 10 so that the head 26 is held against individual rotation and the hub 10 rotates with the latter and the head 26 can be moved inward or outward, that is, toward or from the head 30, by turning the nut 40 correspondingly, namely, screwing or unscrewing the same on the threaded end 41 of the hub 10. The outer end of the nut 40 is provided with a polygonal head 47 for the convenient application of a wrench or other tool, to permit of easily screwing the nut inward or outward on the threaded end 41 of the hub 10.

In assembling the parts, the nut 40 is screwed inward on the hub 10 thus moving the hub head 26 in a like direction to permit of conveniently engaging the several spokes 15, 16, 17 and 18 with the sockets 19 and the flanges 25, 27 and 28, 29. When this has been done, the nut 40 is screwed outwardly to firmly seat the balls 19 in their sockets 20 and to thus draw the spokes 15, 16, 17 and 18 tight to insure a firm connection with the hub and the rim.

The spokes 15, 16 have their hub ends 22 and their ball ends 19 spaced apart and the ends of the spokes 17, 18 are similarly disposed, and the spokes 15, 16 and 17, 18 converge outwardly from the hub and are preferably disposed approximately tangentially to the corresponding head flanges 25, 27 and 28, 29.

By reference to Fig. 2 it will be noted that the spokes 15 and 16 are arranged in parallel conical surfaces, and the spokes 17 and 18 are likewise disposed in parallel conical surfaces, but the conical surfaces of the spokes 15 and 16 are converging outwardly from the hub relative to the conical surfaces of the spokes 17 and 18. It will further be noted that the sockets 20 of the spokes 16 and 17 are arranged intermediate the sockets 20 of the spokes 15 and 18, that is, the latter sockets are located near the edges of the rim 12.

By arranging the spokes 15, 16 and 17, 18 in pairs and one relative to the other, as shown and described, it is evident that a truss construction is provided thus rendering the wheel exceedingly strong and durable. By making the head 26 movable toward and from the head 30, it is evident that the spokes are drawn tight without the use of nipples, nuts and like devices now generally used in the construction of wheels of this type.

It will further be noticed that in case a spoke is broken or injured and needs replacing by a new one then it is only necessary for the operator to screw the nut 40 inward, when owing to the ball and socket connection of the spokes with the rim, the spokes will be loosened throughout, thus permitting removing of the angular members 22 from their recesses 23 and the withdrawal of the spoke from the corresponding socket. In a like manner, a new spoke may be inserted and its angular member 22 engaged with the corresponding recess 23, after which the nut 40 is screwed outward to draw all the spokes tight, as previously explained.

An annular protecting band 50 extends around the hub intermediate the flanges 27 and 28, and this band is made of leather, canvas or like flexible material and is held in extended position by a spring 51 coiled around the hub 10. The band 50 prevents dust and other extraneous matter from clogging up the threads on the hub 10.

Having thus described my invention, I claim as new and desire to secure by Letters Patent:

1. A wire spoke wheel, comprising a hub made in sections adjustable one relative to the other, each section having two flanges, a rim, and pairs of front and rear wire spokes, of which the pairs of front spokes are secured to the flanges of the front hub section and to the rim, and the rear pairs of spokes are secured to the flanges of the rear hub section and to the said rim, the spokes of one pair of spokes crossing each other approximately midway between the hub and the rim and crossing the spokes of the other pair between their point of crossing and the rim.

2. A wire spoke wheel, comprising a hub made in sections adjustable one relative to the other, each section having two flanges, a rim and pairs of front and rear wire spokes, of which the pairs of front spokes are secured to the flanges of the front hub section and to the rim and the rear pairs of spokes are secured to the flanges of the rear hub section and to the said rim, corresponding pairs of front and rear spokes crossing each other, the said wire spokes of the pairs of spokes being arranged one relative to the other to form a truss construction, the outer ends of the spokes having ball and socket connections with the rim, and the inner ends of the spokes having angular members engaging non-radial seats in the peripheral faces of the hub sections.

3. A wire spoke wheel, comprising a hub made in sections adjustable one relative to the other, a rim and pairs of front and rear wire spokes, of which the pairs of front spokes connect the front hub section with the rim and the rear pairs of spokes connect the rear hub section with the said rim, corresponding pairs of front and rear spokes crossing each other, the outer ends of the spokes having ball and socket connections with the rim and the inner ends of the spokes having angular members engaging non-radial seats in the peripheral faces of the hub sections, the said angular members being split.

4. In a wire spoke wheel, a hub having one end threaded and provided at its other end with a fixed head, a head movable toward and from the fixed head and having an annular peripheral groove, a nut screwing on the hub within the movable head and having an annular groove registering with the groove of the hub, and a ring in the said grooves.

5. A wire spoke wheel, comprising a rim, pairs of front and rear wire spokes and a hub, the latter having a double flanged head integral at one end, and a double flanged head movable toward the said fixed head, the spokes of each front pair of spokes being connected at their inner ends to the flanges of the said movable head and the spokes of each rear pair of spokes being connected at their inner ends with the flanges of the said fixed head, the outer ends of the spokes having ball and socket joint connections with the said rim, and a nut screwing on the outer threaded end of the hub and having a polygonal head at its outer end, the said nut carrying the said movable double flanged head to move the latter bodily toward or from the said fixed head on screwing the nut inward or outward on the hub.

6. A wire spoke wheel, comprising a rim, pairs of front and rear wire spokes and a hub, the latter having a double flanged head integral at one end and a double flanged head movable toward the said fixed head, the spokes of each front pair of spokes being connected at their inner ends to the flanges of the said movable head and the spokes of each rear pair of spokes being connected at their inner ends with the flanges of the said fixed head, the outer ends of the spokes having ball and socket joint connections with the said rim, and a nut screwing on the outer threaded end of the hub and having a polygonal head at its outer end, the said nut carrying the said movable double flanged head to move the latter bodily toward or from the said fixed head on screwing the nut inward or outward on the hub, the said movable head having a key and the hub having a keyway engaged by the said key to hold the movable head against turning on screwing the nut inward or outward.

GABRIEL P. B. HOYT.